(12) United States Patent
Hater et al.

(10) Patent No.: US 6,398,958 B1
(45) Date of Patent: Jun. 4, 2002

(54) FACULTATIVE LANDFILL BIOREACTOR

(75) Inventors: Gary R. Hater; Roger B. Green, both of Cincinnati, OH (US); Jeffrey M. Harris, Cypress, TX (US)

(73) Assignee: Waste Management, Inc., Houston, TX (US)

( * ) Notice: Subject to any disclaimer, the term of this patent is extended or adjusted under 35 U.S.C. 154(b) by 0 days.

(21) Appl. No.: 09/520,935

(22) Filed: Mar. 8, 2000

(51) Int. Cl.[7] .................................................. C02F 3/00
(52) U.S. Cl. ....................................................... 210/605
(58) Field of Search ................................ 210/615–618, 210/621, 622, 605, 610, 630

(56) References Cited

U.S. PATENT DOCUMENTS

| | | | |
|---|---|---|---|
| 5,605,417 A | * 2/1997 | Englert et al. | 405/128.45 |
| 5,695,641 A | * 12/1997 | Cosulich et al. | 210/603 |
| 5,888,022 A | * 3/1999 | Green | |
| 5,976,377 A | * 11/1999 | Hyfantis, Jr. | |
| 5,984,580 A | * 11/1999 | Ham | |
| 6,033,559 A | * 3/2000 | Bender et al. | 210/150 |
| 6,283,676 B1 | * 9/2001 | Hater et al. | 210/747 |

FOREIGN PATENT DOCUMENTS

JP 11-216440 A1 * 8/1999

* cited by examiner

Primary Examiner—Chester T. Barry
(74) Attorney, Agent, or Firm—McDonnell Boehnen Hulbert & Berghoff

(57) ABSTRACT

A method and apparatus for sequentially nitrifying ammonia in landfill leachate ex situ and then returning the nitrified landfill leachate to the landfill where the leachate is denitrified.

11 Claims, 2 Drawing Sheets

FACULTATIVE LANDFILL BIOREACTOR

BACKGROUND OF THE INVENTION (1) Field of the Invention

This invention concerns a method and apparatus for sequentially nitrifying ammonia in landfill leachate ex situ and then returning the nitrified landfill leachate to the landfill for denitrification.

(2) Description of the Art

Landfill bioreactors as they are currently known and used are devices and constructions that enhance the aerobic and/or anaerobic degradation (fermentation) of municipal solid wastes. Currently available landfill bioreactors are flawed in that no attempt is made to control the cycling of inorganic forms of nitrogen present in the landfill waste material and present in the landfill leachate. As a result, the landfill leachate ammonia concentration increases over time creating leachate disposal problems and also aerobic and anaerobic microorganism poisoning where the ammonia containing leachate is recycled to promote landfill bioremediation.

Only a rare few landfills use denitrification processes to remove ammonia from landfill leachate. These facilities generally use sequential batch nitrification and denitrification reactors.

Generally, ammonia accumulation in landfill leachate has been ignored in the design of bioreactors. Thus, current landfill bioreactor design overlooks nitrogen cycle management. As a result, landfill bioreactors are prone to becoming unstable and uncontrollable due to ammonia accumulation in the wastewater. Therefore, landfill bioreactor designs that successfully manage the nitrogen cycle are needed.

SUMMARY OF THE INVENTION

It is an object of this invention to provide methods and apparatuses for managing the nitrogen cycle in a landfill bioreactor and, in particular, in managing landfill leachate ammonia.

It is another object of this invention to provide methods and apparatuses for controlling leachate ammonia in a manner that does not require ex-situ leachate disposal.

It is yet another object of this invention to provide methods and apparatuses for controlling the nitrogen cycle of a landfill bioreactor that promotes landfill bioremediation.

It is a further object of this invention to provide a method and apparatus for controlling the nitrogen cycle of a landfill bioreactor that minimizes the risk of landfill fires.

In one embodiment, this invention is a method for reducing the ammonia level of landfill leachate. The method begins by withdrawing ammonia containing leachate from a landfill. The ammonia containing leachate is directed into an attached growth nitrification unit. The ammonia containing leachate remains in the attached growth nitrification unit for a period of time sufficient to nitrify at least 50% of the ammonia in the leachate to form a nitrified aqueous product including nitrite and nitrate. Finally, the nitrified aqueous product is returned to the landfill or to another landfill where it is denitrified in situ.

DESCRIPTION OF THE CURRENT EMBODIMENT

The present invention relates to methods and apparatuses for sequentially nitrifying ammonia in landfill leachate ex situ and then returning the nitrified landfill leachate to the landfill for in situ denitrification.

Before describing the methods and apparatuses of this invention, several terms that are used to describe the invention will be defined.

The term "nitrification" as used herein refers to the conversion of ammonia (ammonium ions) to nitrite and nitrate using one or more nitrifying microorganisms.

The term "denitrification" as used herein refers to the conversion of nitrite and nitrate into nitrogen gas using one or more microorganisms.

Figure 1:
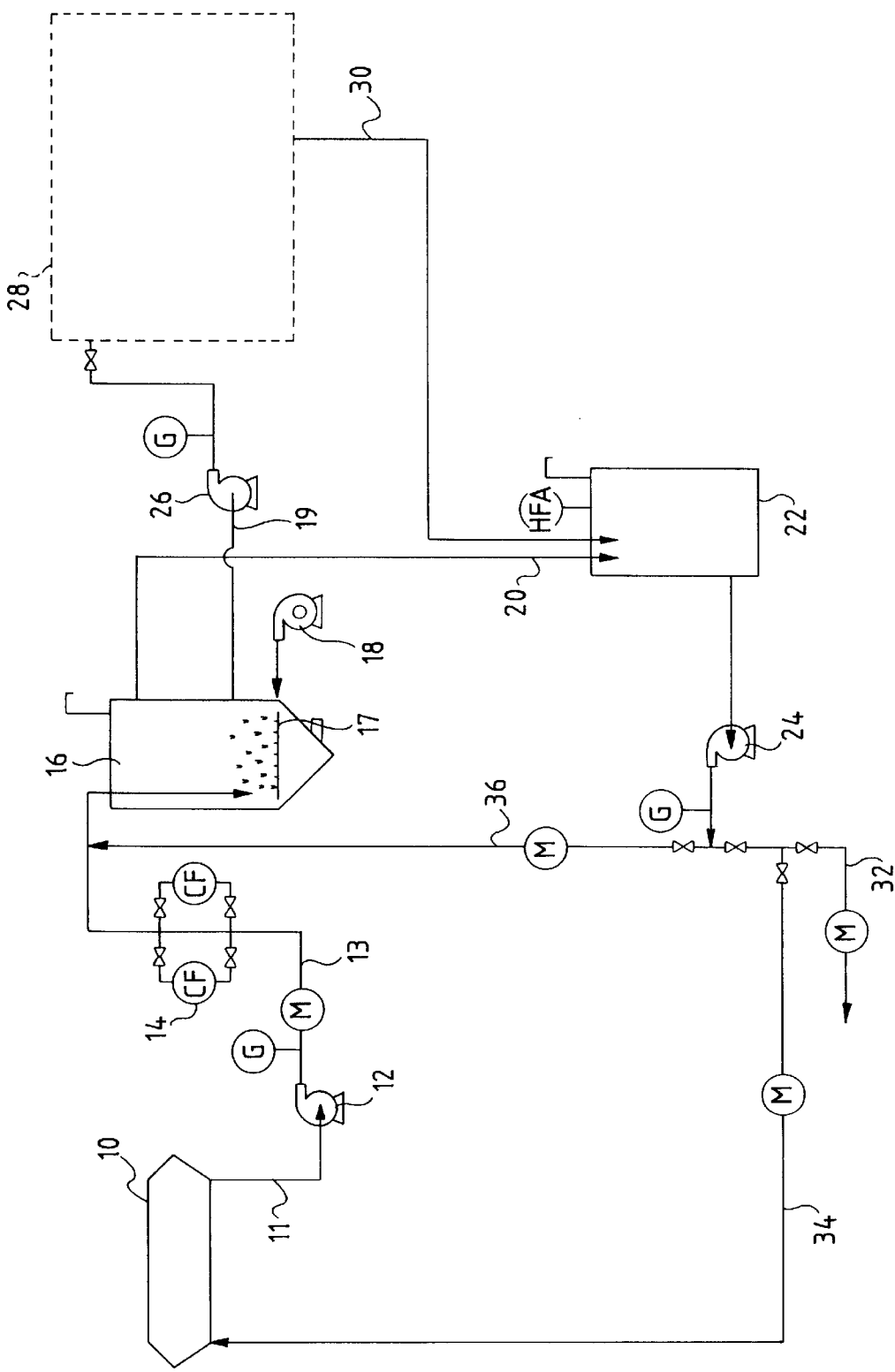
FIG. 1 is a schematic of a nitrification process of this invention.

A schematic of a method of this invention is found in FIG. 1. According to FIG. 1, ammonia containing leachate is withdrawn from landfill 10 through pipe 11. Leachate transfer pump 12 pumps the ammonia containing leachate through transfer pump outlet pipe 13, through a filter manifold 14, an into equalization tank 16. The equalization tank 16 ensures that a constant rate of ammonia containing leachate is available for the nitrification step. In addition, equalization tank 16 includes a sparge tube 17 which is associated with a compressor 18. Compressor 18 directs the air into sparge tube 17 and aerates the ammonia containing leachate in equalization tank 16. Finally, equalization tank 16 includes an overflow pipe 20.

Ammonia containing leachate in equalization tank 16 is directed through the pipe 19 into distribution pump 26. Distribution pump 26 pumps the ammonia containing leachate from equalization tank 16 into attached growth nitrification unit 28 where the ammonia containing leachate is nitrified. The nitrified leachate product, which includes nitrite but primarily nitrate, then flows through outlet pipe 30 into sump tank 22. Sump pump 24 pumps the nitrified leachate back to landfill 10 through pipe 34. Already the nitrified leachate can be directed for another use or to disposal through pipe 32. The process includes a recycle line 36 which allows for recycle of some or all of the nitrified leachate back to equalization tank 16.

Figure 2A:
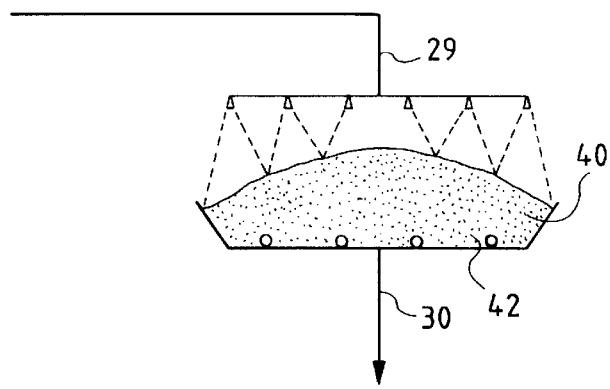
FIGS. 2A, 2B, and 2C represent three of many embodiments of attached growth nitrification units useful in the methods and apparatuses of this invention.
Figure 2B:
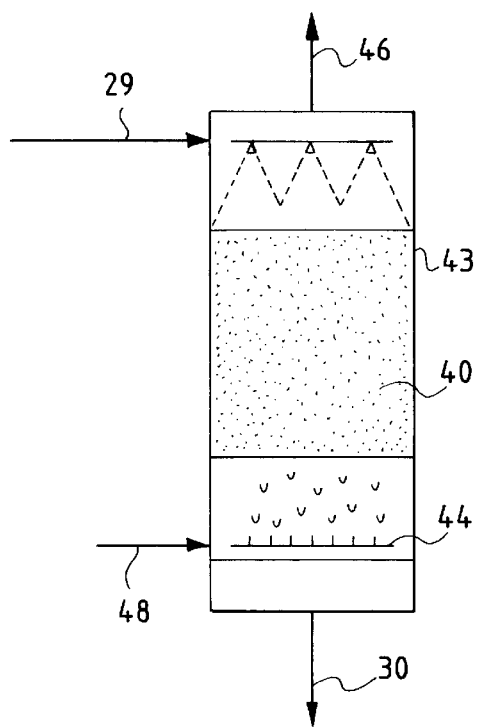
Figure 2C:
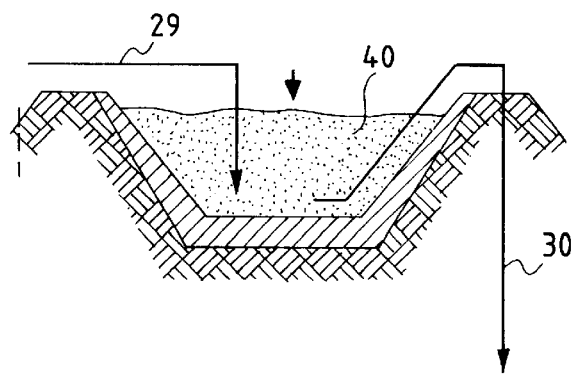

An important feature of the leachate nitrification process of this invention is attached growth nitrification unit 28. FIGS. 2A–2C depicts several of many designs for attached growth nitrification unit 28. Each of the attached growth nitrification units depicted in FIGS. 2A–2C include several similar features. Each ammonia containing leachate includes inlet piping 29 and nitrified leachate outlet piping 30. Each attached growth nitrification unit also includes a bed of fixed organic or inorganic substrate 40. The fixed organic or inorganic substrates may be any material that can bind nitrification organisms. Examples of fixed organic or inorganic substrates include wood chips, tire chips, and plastic balls or other media.

In FIG. 2A, the fixed substrates are located in an open container or bermed pit. The ammonia containing leachate is sprayed over the top of a heap of fixed substrate material and nitrified leachate flows into collection pipes 42 for return to the landfill. In FIG. 2B, fixed substrate 40 is located in a reactor vessel 43. Once again, the ammonia containing leachate is distributed evenly over the fixed substrate 40 by spraying or by any other uniform distribution method. Reactor 43 shown in FIG. 2B further includes a sparge tube 44 which aerates the liquid in the tank. Reactor 43 also includes a gas outlet 46. Aeration occurs in reactor 43 when air or an oxygen containing gas is directed through aeration inlet pipe 48 into sparge tube 44. FIG. 2C depicts a lined impoundment that contains fixed substrates 40. Ammonia containing leachate is directed into the fixed substrates and allowed to react with nitrifying microorganisms associated with the fixed substrates. An outlet pipe withdraws nitrified leachate from a sump or from distribution pipe laying on the bottom of the lined impoundment and return the nitrified leachate to a landfill or to some other disposal facility.

An important aspect of the attached growth nitrification unit is the choice of nitrification organisms that are applied to the fixed substrates. Examples of useful nitrifying microorganisms include bacteria of the genera Nitrosomonas and Nitrobacter.

Alternatively, the nitrifying organisms that are added to the fixed growth nitrification unit may be added in the form of sludge or, fixed organic or inorganic substrates that include nitrifying microorganisms. Once the fixed organic or inorganic substrates are inoculated with nitrifying organisms, the fixed bed nitrification unit is ready to be used for leachate nitrification.

The fixed bed leachate nitrification unit should be operated in a manner that converts at least 50% and preferably 90% or more of the incoming ammonia into nitrite and nitrate. The incoming leachate will typically have an ammonia content ranging from about 10 to about 200 ppm preferably, the ammonia content will decrease to about 1 to about 50 ppm. The ammonia content of the nitrified leachate can be controlled primarily by controlling the residence time of the ammonia containing leachate feed in the fixed growth nitrification unit. The pH of the ammonia containing leachate is an important process parameter. Preferably, the ammonia containing leachate will have a pH from about 7 to about 8.5. Occasionally, the ammonia containing leachate pH will fall below this range in which case the pH may be adjusted by adding lime or caustic to the ammonia containing leachate feed. The ammonia containing leachate which has been nitrified by ex situ may now be returned to the landfill for denitrification in situ. The in situ denitrification occurs when nitrite and nitrate in the nitrified leachate are converted by organisms in the landfill are converted into nitrogen gas by naturally occurring denitrifying organisms in the landfill. Denitrification occurs in landfills that are undergoing either aerobic or anaerobic decomposition. An important aspect of this invention is that oxygen does not need to be added to the landfill in order to denitrify the nitrified leachate. Therefore, risk of landfill fires caused by oxygen injection into a landfill is significantly reduced.

What we claim is:

1. A method for reducing the ammonia level of landfill leachate comprising the steps of:
    (a) withdrawing ammonia containing leachate from a landfill;
    (b) directing the ammonia containing leachate to an ex situ attached growth nitrification unit;
    (c) maintaining the ammonia containing leachate in the attached growth nitrification unit for a period of time sufficient to nitrify at least 50% of the ammonia in the leachate to form a nitrified aqueous product including nitrite and nitrate; and
    (d) denitrifying the nitrified aqueous product in situ by applying the nitrified aqueous product to said landfill.

2. The method of claim 1 wherein the leachate contains from about 10 to 2000 ppm ammonia.

3. The method of claim 1 wherein at least 90% of the ammonia is denitrified.

4. The method of claim 1 wherein the nitrified aqueous product is returned to the landfill by distributing the nitrified aqueous product over the landfill surface.

5. The method of claim 1 wherein the nitrified aqueous product is returned to the landfill by injecting the nitrified aqueous product into the landfill mass.

6. The method of claim 1 wherein the pH of the leachate directed to the attached growth nitrification unit ranges from about 7.0 to about 8.5.

7. The method of claim 1 wherein the attached growth nitrification unit includes nitrifying organisms attached to a substrate.

8. The method of claim 7 wherein the nitrifying organisms are selected from the group of organisms consisting of bacteria of the genera Nitrosomonas, Nitrobacter, and mixtures thereof.

9. The method of claim 7 wherein the nitrifying organisms are added to the attached growth nitrification unit before directing leachate into the attached growth nitrification unit.

10. The method of claim 9 wherein the attached growth nitrification unit is inoculated with nitrification organisms.

11. The method of claim 9 wherein a sludge that includes nitrification organisms is combined with a substrate in a vessel to form an attached growth nitrification unit.

* * * * *